US009129551B2

(12) United States Patent
Kim et al.

(10) Patent No.: US 9,129,551 B2
(45) Date of Patent: Sep. 8, 2015

(54) DRIVING CIRCUIT OF DISPLAY APPARATUS AND DRIVING CHIP

(75) Inventors: Young-Gi Kim, Daejeon-si (KR); Na-Ra Hong, Daejeon-si (KR); Hye-Lan Kim, Asan-si (KR); Joon-Ho Na, Daejeon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 191 days.

(21) Appl. No.: 13/422,961

(22) Filed: Mar. 16, 2012

(65) Prior Publication Data

US 2012/0235964 A1 Sep. 20, 2012

(30) Foreign Application Priority Data

Mar. 18, 2011 (KR) ........................ 10-2011-0024479

(51) Int. Cl.
*G06F 3/038* (2013.01)
*G09G 3/20* (2006.01)

(52) U.S. Cl.
CPC .......... *G09G 3/20* (2013.01); *G09G 2310/0275* (2013.01); *G09G 2330/026* (2013.01); *G09G 2370/08* (2013.01)

(58) Field of Classification Search
CPC ......... G06F 3/038; G06F 3/01; G09G 3/3233; G09G 3/3291; G09G 2310/0297; G09G 2320/0295
USPC .......................................................... 345/204
See application file for complete search history.

(56) References Cited

U.S. PATENT DOCUMENTS

| | | | | |
|---|---|---|---|---|
| 2003/0076282 | A1* | 4/2003 | Ikeda et al. | 345/55 |
| 2004/0252112 | A1* | 12/2004 | Fukuda et al. | 345/204 |
| 2008/0100609 | A1* | 5/2008 | Lee et al. | 345/212 |
| 2008/0129761 | A1* | 6/2008 | Kim et al. | 345/690 |
| 2008/0284691 | A1* | 11/2008 | Chung et al. | 345/76 |
| 2009/0213046 | A1* | 8/2009 | Nam | 345/76 |
| 2009/0219238 | A1* | 9/2009 | Furuya et al. | 345/87 |
| 2010/0245338 | A1* | 9/2010 | Todorovich | 345/214 |
| 2011/0122119 | A1* | 5/2011 | Bae et al. | 345/211 |
| 2011/0175885 | A1* | 7/2011 | Shirouzu | 345/211 |
| 2011/0234574 | A1* | 9/2011 | Tanaka et al. | 345/211 |
| 2013/0155038 | A1* | 6/2013 | Yamashita et al. | 345/204 |

FOREIGN PATENT DOCUMENTS

| | | |
|---|---|---|
| KR | 10-2006-0117715 | 11/2006 |
| KR | 10-2009-0078577 | 7/2009 |
| KR | 10-2009-0112874 | 10/2009 |
| KR | 10-2010-0099927 | 9/2010 |

* cited by examiner

*Primary Examiner* — Fred Tzeng
(74) *Attorney, Agent, or Firm* — Kile Park Reed & Houtteman PLLC

(57) ABSTRACT

Disclosed are a driving circuit of a display apparatus and a driving chip, which shuts off the output of image data, in a display apparatus in which a plurality of driving chips is connected to each other in a daisy chain method to correspond to a single display panel, when serial communication of the driving chips is not completed successfully, or when any one of the driving chips is not operated normally, thereby preventing an abnormal screen from being displayed.

18 Claims, 5 Drawing Sheets

DRIVING CIRCUIT OF DISPLAY APPARATUS AND DRIVING CHIP

FIELD OF THE INVENTION

The present invention relates to a driving circuit of a display apparatus that drives a display panel.

DESCRIPTION OF THE RELATED ART

In recent years, flat panel display devices, such as LCD (Liquid Crystal Display) devices, PDPs (Plasma Display Panels), OLED (Organic Light-Emitting Diode) panels, and the like, have become prevalent, and are widely used.

FIG. 1 is a block diagram for a display apparatus according to the related art.

Referring to FIG. 1, the display apparatus according to the related art includes a single timing control chip 100 and a plurality of source driver ICs (integrated circuits) 110A to 110D.

The timing control chip 100 is connected to a serial data line (SDA) for serial data transmission and a serial clock line (SCL) for serial clock transmission, reads initialization information from an EEPROM (Electrical Erasable Programmable Read Only Memory) (not shown) on a main board through I2C (Inter-Integrated Circuit) communication in an initialization stage, and so on.

When the I2C communication succeeds, the timing control chip 100 provides, to the plurality of source driver ICs 110A to 110D, image data (for example, black data) and enable signals, which are generated using a clock of an internal oscillator. When the I2C communication fails, the timing control chip 100 does not provide the enable signals to any of the plurality of source driver ICs 110A to 110D.

The timing control chip 100 of the display apparatus according to the related art drives all of the plurality of source driver ICs 110A to 110D, or does not drive them, depending on whether the I2C communication succeeds, so that an unnatural black screen is prevented from being displayed on a display panel 120 when normality signals are not inputted.

In recent years, to meet the requirement for increasingly larger and thinner display apparatuses, driving chips in which the timing control chip and the source driver ICs are merged into a single chip that performs multiple functions have been developed. The multi-function driving chip includes its own oscillator formed therein, and performs a timing control function and a source driver driving function using a clock generated from the oscillator. In order to drive the display panel, the multi-function driving chips are connected to each other in a daisy chain method, and each of the driving chips may be operated as a master chip that generates a clock.

In an initialization stage, and the like, a plurality of driving chips reads initialization information from an EEPROM through I2C communication. In this instance, when any one driving chip fails to perform I2C communication, even though the other driving chips succeed in performing I2C communication, the driving chip that fails to perform I2C communication fails to output image data (for example, black data) on the display panel, unlike the other driving chips, so that there is a problem in that an abnormal screen (unnatural black screen) is displayed on the display panel.

SUMMARY OF THE INVENTION

Accordingly, the present invention has been made in an effort to solve the problems occurring in the related art, and an object of the present invention is to provide, in a display apparatus in which driving chips for driving a display panel are connected to each other in a daisy chain method, a driving circuit of a display apparatus that shuts off the output of image data when serial communication of the driving chips is not successfully completed, or when at least one of the driving chips is not operated normally.

Objects of the present invention are not limited to the above-described object. Other objects and advantages of the present invention will be apparent from the following description.

In order to achieve the above object, according to one aspect of the present invention, there is provided a driving circuit of a display apparatus which transmits image data to a display panel, the driving circuit including: a plurality of driving chips, in which a timing driving chip and a source driving chip are merged into a single chip, and in which serial communication with a memory is performed through a common communication line to obtain information for driving the display panel, wherein the plurality of driving chips includes a master driving chip and a plurality of slave driving chips, wherein the driving chips sequentially execute an operation of transmitting a first enable signal in one direction when communication with the memory is performed and is normally completed in an initialization stage, wherein a final stage driving chip among the driving chips transmits a second enable signal in the other direction opposite to the one direction, generates image data, and transmits the generated image data to the display panel when communication with the memory is performed and is normally completed after the first enable signal is received, and wherein the driving chips, other than the driving chip of the final stage, sequentially receive the second enable signal in an order opposite an order in which the first enable signal was transmitted, generate image data in the order of reception, and transmit the generated image data to the display panel.

The plurality of driving chips may be connected to each other in a daisy chain method.

The plurality of driving chips may perform the serial communication in an I2C method or using an SPI (Serial Peripheral Interface) protocol.

The second enable signal provided from the driving chip of the final stage may be transmitted to a first driving chip and a second driving chip through a separate signal line.

The plurality of driving chips may perform communication with the memory in accordance with a priority set in advance.

The time of the initialization may include a time when electric power is applied and a normality signal is not inputted, or a time when electric power is applied and an abnormality signal, outside a normal operation range, is inputted.

The image data may include black data.

In order to achieve the above object, according to another aspect of the present invention, there is provided a driving circuit in which a timing driving chip and a source driving chip are merged into a single chip, driving information is obtained through serial communication with a memory, and image data is transmitted to a display panel, the driving circuit, including: a driving chip configured to transmit a first enable signal to an adjacent driving chip when the serial communication with the memory is completed successfully at the time of initialization, transmit a received second enable signal to another driving chip, oriented in a direction opposite that of the adjacent driving chip when the second enable signal which indicates that the serial communication of all of the driving chips has successfully completed is received from the adjacent another driving chip, generate image data using a clock of an internal oscillator, and transmit the generated image data to the display panel.

The driving chip may include a transmission/reception unit configured to perform the serial communication with the memory in response to a communication enable signal (I2C_EN) supplied from the signal processing unit; a detection unit, configured to detect whether the serial communication has been completed successfully in the transmission/reception unit and output a detection signal (DETECT) in accordance with the detection; a register, configured to store driving information provided from the transmission/reception unit and provide the driving information to a source driving unit and a timing control unit; the source driving unit, configured to generate image data in response to a source driver-on signal (SD_ON) provided from the signal processing unit; the timing control unit, configured to provide a timing signal required for driving the source driving unit; and a signal processing unit, configured to enable the transmission/reception unit when the signal processing unit is set as a first priority with reference to a priority set in advance at an initialization stage, during which the application of electric power starts, to receive notification of completion of serial communication from the detection unit, to generate the first enable signal, to provide the generated first enable signal to the driving chip of a subsequent stage, and to generate the source driver-on signal (SD_ON) when the second enable signal is received from the adjacent another driving chip.

The signal processing unit may perform an operation on chip selection signals CS[0] and CS[1], which determine the priority of the serial communication with the memory, and a first enable input signal (PRE_EN1) provided from the adjacent driving chip to thereby generate a communication enable signal (I2C_EN), perform an operation on the communication enable signal (I2C_EN), the detection signal (DETECT), and the chip selection signals CS[0] and CS[1] to thereby generate a first enable output signal (NEXT_EN1), perform an operation on the communication enable signal (I2C_EN), the chip selection signals CS[0] and CS[1], and the detection signal (DETECT) to thereby generate a second enable output signal (NEXT_EN2), and perform an operation on the second enable output signal (NEXT_EN2) and a second enable input signal (PRE_EN2) to thereby generate a source driver-on signal (SD_ON).

BRIEF DESCRIPTION OF THE DRAWINGS

The above objects and other features and advantages of the present invention will become more apparent after a reading of the following detailed description taken in conjunction with the drawings, in which.

DETAILED DESCRIPTION OF PREFERRED EMBODIMENTS

Figure 1:
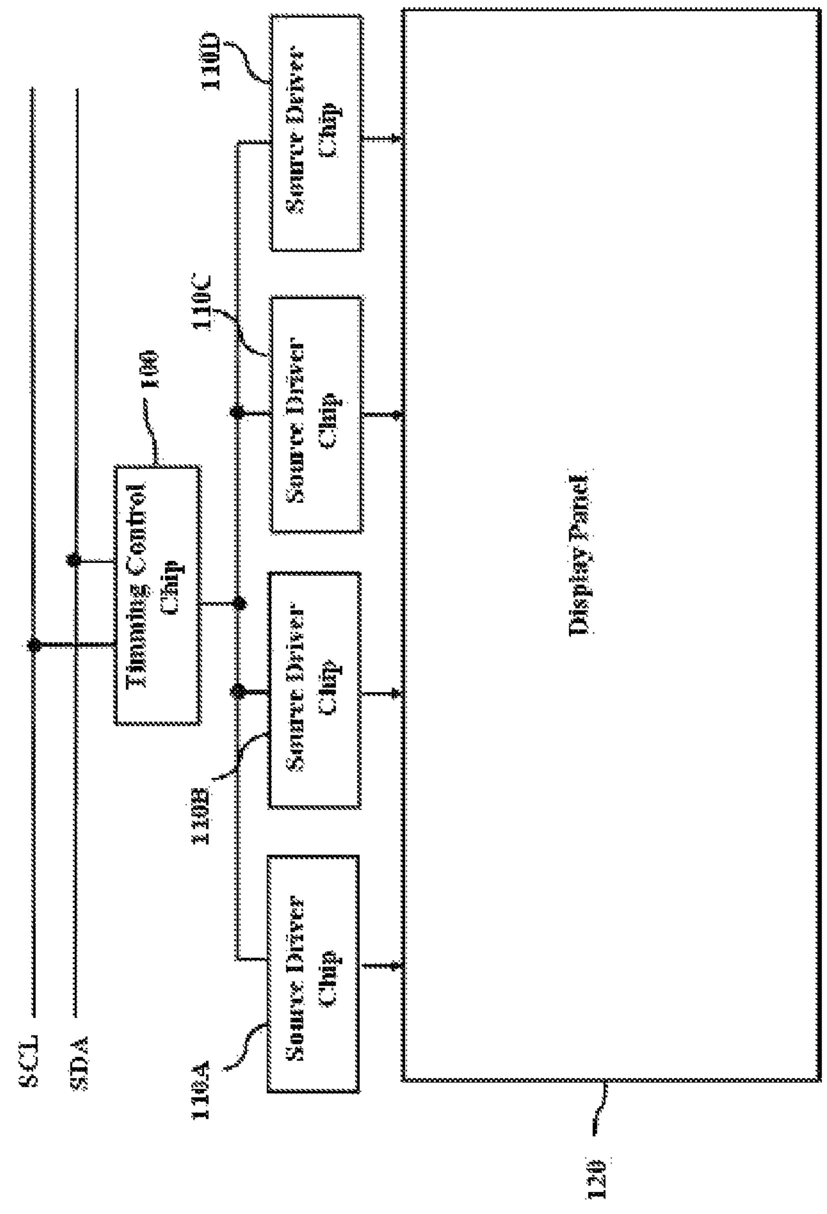
Fig. 1 (Prior Art)
FIG. 1 is a block diagram of a display apparatus according to the related art.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
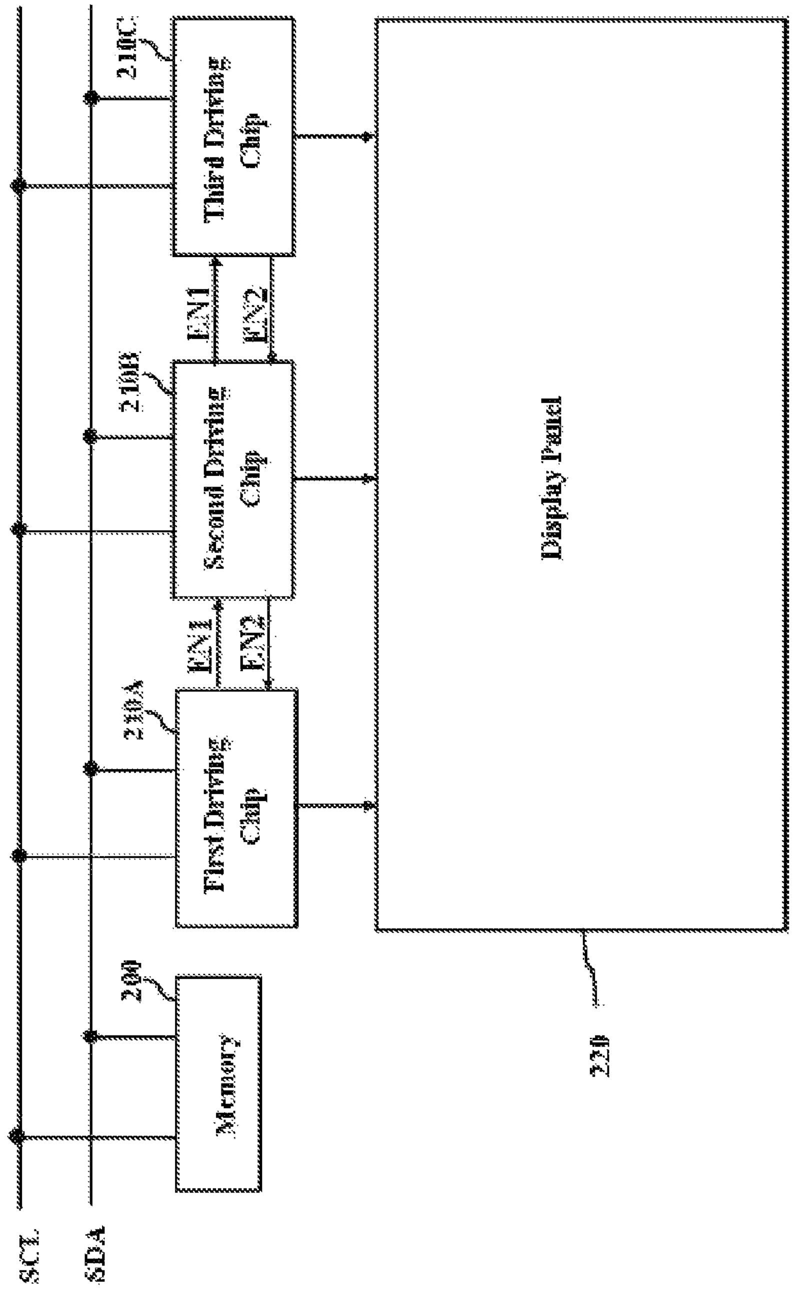
FIG. 2 is a block diagram of a driving circuit of a display apparatus according to an embodiment of the present invention.

FIG. 2 is a block diagram of a driving circuit of a display apparatus according to an embodiment of the present invention.

As shown in FIG. 2, the driving circuit of the display apparatus according to an embodiment of the present invention includes a memory 200, a first driving chip 210A, a second driving chip 210B, and a third driving chip 210C. The first driving chip 210A, the second driving chip 210B, and the third driving chip 210C perform a timing control function and a source driving function, and generate a clock using an internal oscillator to thereby be operated as a master chip.

The first driving chip 210A, the second driving chip 210B, and the third driving chip 210C are connected to each other in a daisy chain method so as to drive a display panel 220, and perform communication with the memory 220 through a data line (SDA) and a clock line (SCL) in an I20 (Inter-Integrated Circuit) method. The display panel 220 may be a flat display panel, such as an LCD (Liquid Crystal Display), an AMOLED (Active Matrix Organic Light-Emitting Diode), or the like.

The memory 200 may be a non-volatile memory in which driving information is stored, for example, an EEPROM (Electrically Erasable Programmable Read-Only Memory). The memory 200 may receive a clock, and may be operated as a slave chip in a manner such that an address is allocated.

The driving information includes initial information for driving the display panel 220.

It is preferable that a priority be set between the first driving chip 210A, the second driving chip 210B, and the third driving chip 210C so as to avoid collisions at the time of I2C communication with the memory 200. The priority may be set using option pins. In the present embodiment, an example is described in which the priority is set, in descending order, as the first driving chip 210A, the second driving chip 210B, and the third driving chip 210C.

Next, the operations of a driving device of the display panel according to the present embodiment in an initialization stage and the like will be described. Here, the initialization stage includes an initialization state in which electrical power is applied and a normality signal is not inputted, and an initialization state in which electric power is applied and an abnormality signal is inputted.

The first driving chip 210A performs communication with the memory 200 in the I2C method when electric power is applied, and provides a first enable signal (EN1) to the second driving chip 210B when communication is successfully completed. The second driving chip 210B performs communication with the memory 200 in the I2C method when the first enable signal (EN1) is received, and provides the first enable signal (EN1) to the third driving chip 210C. The third driving chip 210C performs communication with the memory 200 in the I2C method when the first enable signal (EN1) is received, generates a second enable signal (EN2), provides the generated second enable signal (EN2) to the second driving chip 210B when communication is successfully completed. The second driving chip 210B transmits the second enable signal (EN2) to the first driving chip 210A.

Each of the first driving chip 210A, the second driving chip 210B, and the third driving chip 210C generates image data using the clock of the internal oscillator in response to the second enable signal (EN2), and provides the generated image data to the display panel 220.

When any one of the first driving chip 210A, the second driving chip 210B, and the third driving chip 210C fails to perform I2C communication with the memory 200, and the third driving chip 210C fails to receive the first enable signal (EN1), the third driving chip 210C does not generate the second enable signal (EN2), so that none of the first driving chip 210A, the second driving chip 210B, and the third driving chip 210C provide the image data to the display panel 220. Accordingly, unlike the display panel in the related art, when any one of the driving chips is not operated normally in the initialization stage or the like, an abnormal screen is not displayed on the display panel 220.

Figure 3:
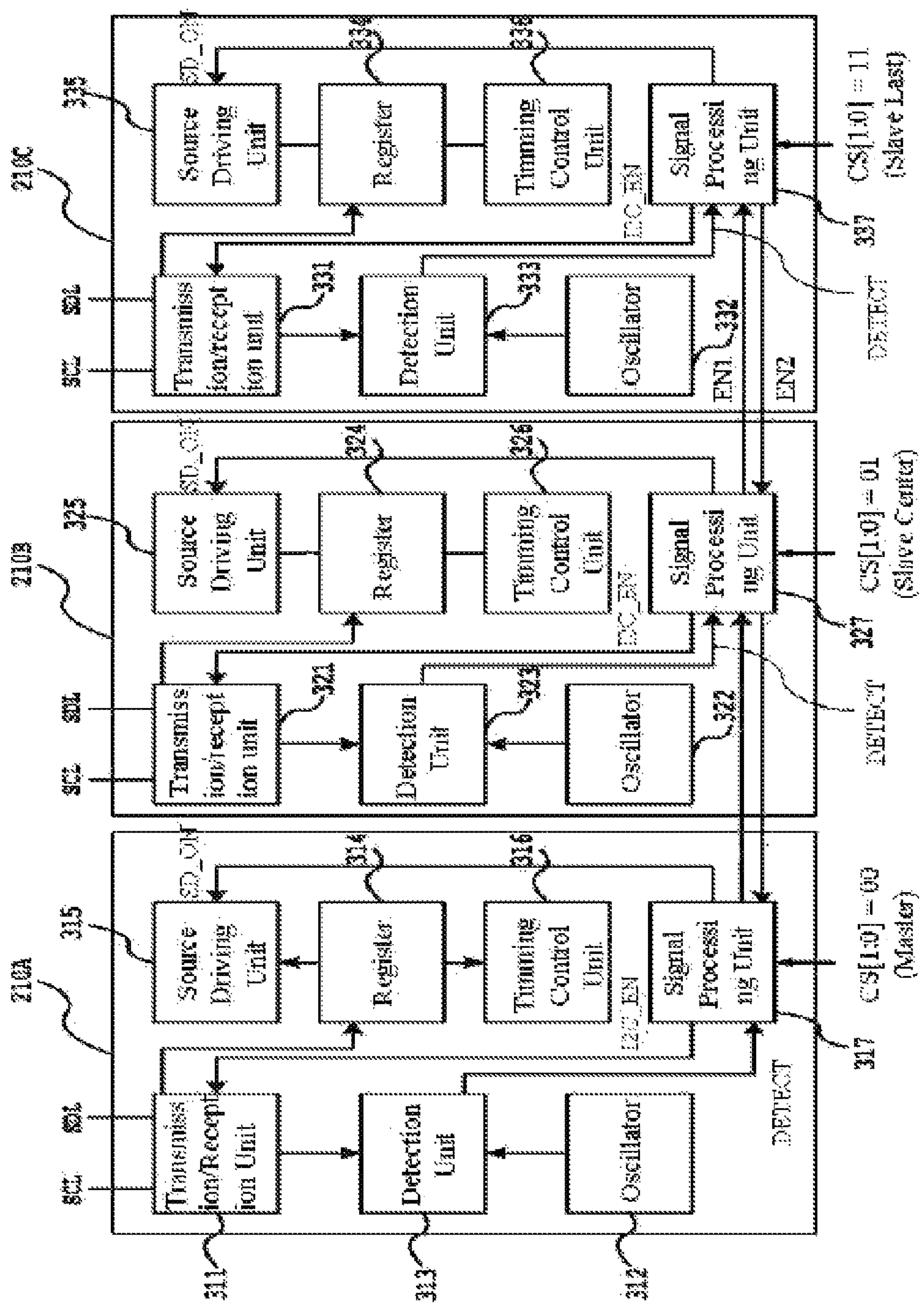
FIG. 3 is a detailed block diagram of first to third driving chips of FIG. 2.

FIG. 3 is a detailed block diagram of the first driving chip 210A, the second driving chip 210B, and the third driving chip 210C.

Referring to FIG. 3, the first driving chip 210A includes a transmission/reception unit 311, an oscillator 312, a detection unit 313, a register 314, a source driving unit 315, a timing control unit 316, and a signal processing unit 317.

The transmission/reception unit 311 performs the I2C communication with the memory 200 through the clock line (SCL) and the data line (SDA) in response to a communication enable signal (I2C_EN) of the signal processing unit 317. The oscillator 312 generates a clock having a required frequency, and provides the generated clock to the detection unit 313 and the like. The detection unit 313 detects whether I2C communication has been successfully completed using the clock of the oscillator 312, and provides a detection signal (DETECT) to the signal processing unit 317. The detection unit 313 may include a circuit and a program that perform a checksum function so as to detect whether I2C communication was completed successfully.

The register 314 stores the driving information provided from the transmission/reception unit 311, and provides the driving information to the source driving unit 315 and the timing control unit 316. The driving information includes information required for initialization driving of the first driving chip 210A.

The source driving unit 315 generates image data in response to a source driver-on signal (SD_ON) provided from the signal processing unit 317, and provides the generated image data to the display panel 220. The generated image data may be black data. The timing control unit 316 generates and provides a timing signal, required for driving the source driving unit 315, and the like.

In the initialization stage, in which electric power is applied, the signal processing unit 317 provides the communication enable signal (I2C_EN) to the transmission/reception unit 311 to thereby enable the transmission/reception unit 311 when the signal processing unit 317 is set as a first priority with reference to the priority set in advance. The signal processing unit 317 receives detection signal (DETECT) notification indicating completion of the I2C communication from the detection unit 313, generates the first enable signal (EN1), provides the generated first enable signal (EN1) to the second driving chip 210B.

When a second enable input signal (PRE_EN2) generated in the third driving chip 210C is received from the second driving chip 210B, the signal processing unit 317 generates the source driver-on signal (SD_ON), and provides the generated source driver-on signal (SD_ON) to the source driving unit 315.

The second driving chip 210B includes a transmission/reception unit 321, an oscillator 322, a detection unit 323, a register 324, a source driving unit 325, a timing control unit 326, and a signal processing unit 327.

In the initialization stage, in which electric power is applied, the signal processing unit 327 waits until the first enable signal (EN1) is provided from the first driving chip 210A when the signal processing unit 327 is set as a second priority with reference to the priority set in advance. The signal processing unit 327 provides the communication enable signal (I2C_EN) to the transmission/reception unit 321 to allow the transmission/reception unit 321 to perform I2C communication when the first enable signal (EN1) is received from the first driving chip 310A.

The signal processing unit 327 receives the detection signal (DETECT), indicating completion of I2C communication, from the detection unit 323, and transmits the first enable signal (EN1) to the third driving chip 210C. When the second enable signal (EN2) is received from the third driving chip 210C, the signal processing unit 327 transmits the second enable signal (EN2) to the first driving chip 210A, generates the source driver-on signal (SD_ON), and provides the generated source driver-on signal (SD_ON) to the source driving unit 325.

The third driving chip 210C includes a transmission/reception unit 331, an oscillator 332, a detection unit 333, a register 334, a source driving unit 335, a timing control unit 336, and a signal processing unit 337.

In the initialization stage, in which electric power is applied, the signal processing unit 337 waits until the first enable signal (EN1) is provided from the second driving chip 210B when the signal processing unit 337 is set as a third priority with reference to the priority set in advance. The signal processing unit 337 provides the communication enable signal (I2C_EN) to the transmission/reception unit 321 to allow the transmission/reception unit 331 to perform I2C communication when the first enable signal (EN1) is received from the second driving chip 210B. The signal processing unit 337 receives the detection signal (DETECT), indicating completion of I2C communication, from the detection unit 333, generates the second enable signal (EN2) to thereby provide the generated second enable signal to the second driving chip 210B, and generates the source driver-on signal (SD_ON) to thereby provide the generated source driver-on signal (SD_ON) to the source driving unit 335.

A chip selection signal CS[1:0] is a signal for setting a priority in a manner such that the chip selection signal CS[1:0] is respectively inputted to the first driving chip 210A, the second driving chip 210B, and the third driving chip 210C through an option pin.

In the present embodiment, the first driving chip 210A is set as '00', the second driving chip 210B is set as '01', and the third driving chip 210C is set as '11'; however, the chip selection signal CS[1:0] is not limited thereto, and may be appropriately adjusted in accordance with the number of driving chips.

Other configurations of the second driving chip 210B and the third driving chip 210C can be easily understood by a person skilled in the art from the descriptions of the first driving chip 210A, and thus a detailed description thereof will be omitted.

Figure 4:
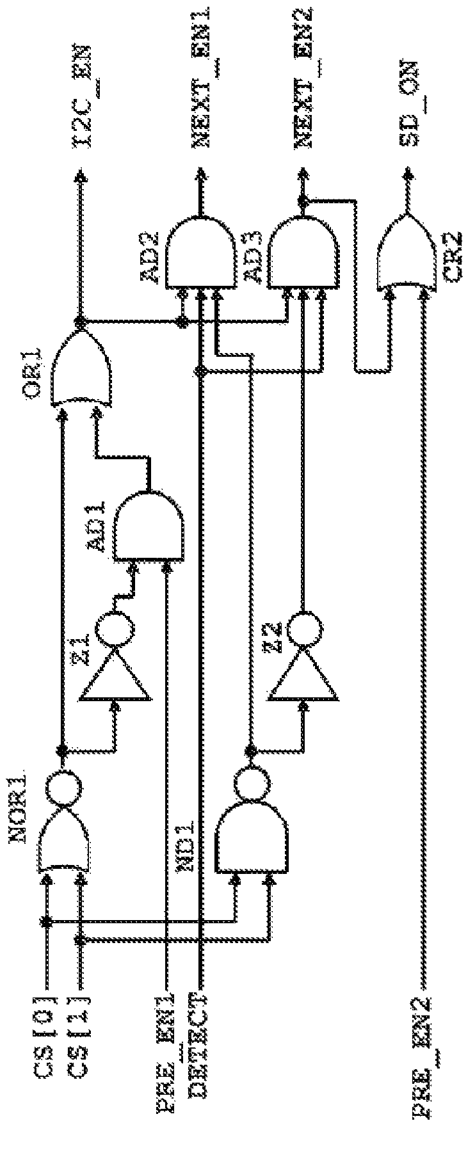
FIG. 4 is a detailed circuit diagram of a signal processing unit of FIG. 3.

FIG. 4 is a detailed circuit diagram of an implementation example of the signal processing unit of the driving chip shown in FIG. 3.

As shown in FIG. 4, each of the signal processing units 317, 327, and 337 of the first to third driving chips 210A, 210B, and 210C includes a NOR gate (NOR1) for performing a NOR operation on the chip selection signals CS[0] and CS[1]; a first inverter (I1) for inverting and outputting an output signal of the NOR gate (NOR1); a first AND gate (AD1) for performing an AND operation on an output signal of the first inverter (I1) and a first enable input signal (PRE_EN1) inputted from the driving chip of a previous stage; a first OR gate (OR1) for outputting a communication enable signal (I2C_EN), generated by performing an OR operation on the output signal of the NOR gate (NOR1), and an output signal of the first AND gate (AD1); a NAND gate (ND1) for performing a NAND operation on the chip selection signals CS[0] and CS[1]; a second inverter (I2) for inverting and outputting an output signal of the NAND gate (ND1); a second AND gate (AD2) for outputting a first enable output signal (NEXT_EN1), generated by performing an AND operation on an output signal of the first OR gate (OR1), a detection signal (DETECT), and the output signal of the NAND gate (ND1); a third AND gate (AD3) for outputting a second enable output signal (NEXT_EN2), generated by performing an AND operation on the output signal of the first OR gate (OR1), the detection signal (DETECT), and an output signal of the second inverter (I2); and a second OR gate (OR2) for outputting a source driver-on signal (SD_ON), generated by performing an OR operation on an output signal of the third AND gate (AD3) and a second enable input signal (PRE_EN2), inputted from the driving chip 210C of the next stage.

In FIG. 4, the first enable input signal (PRE_EN1) and the first enable output signal (NEXT_EN1) are the same as the first enable signal (EN1) of FIGS. 2 and 3; however, they are represented by dividing the first enable signal (EN1) in accordance with input and output on the basis of the signal processing unit 327.

Similarly, in FIG. 4, the second enable input signal (PRE_EN2) and the second enable output signal (NEXT_EN2) are the same as the second enable signal (EN2) of FIGS. 2 and 3; however, they are represented by dividing the first enable signal (EN1) in accordance with input and output on the basis of the signal processing unit 327.

Table 1 shows an output state of a logic gate for generation of an I2C enable signal (I2C_EN) by each of the first to third driving chips 210A, 210B, and 210C.

TABLE 1

| | CS [0] | CS [1] | NOR1 | I1 | PRE_EN1 | AD1 | OR1 |
|---|---|---|---|---|---|---|---|
| First driving chip | 0 | 0 | 1 | 0 | 0 | 0 | 1 |
| Second driving chip | 0 | 1 | 0 | 1 | 1 | 1 | 1 |
| Third driving chip | 1 | 1 | 0 | 1 | 1 | 1 | 1 |

Referring to Table 1, in the first driving chip 210A, which has first priority, it is preferable that the first enable input signal (PRE_EN1) become a logic state of '0', because the driving chip of a previous stage does not exist.

When electric power is applied in the initialization state, the first driving chip 210A activates the I2C enable signal (I2C_EN) as '1', and provides the activated I2C enable signal (I2C_EN) to the transmission/reception unit 311.

When the first enable input signal (PRE_EN1) is activated as '1', and the activated signal is inputted from the first driving chip 210A, the second driving chip 210B, which has second priority, activates the I2C enable signal (I2C_EN) as '1', and provides the activated I2C enable signal (I2C_EN) to the transmission/reception unit 321.

When the first enable input signal (PRE_EN1) is activated as '1', and the activated signal is inputted from the second driving chip 210B, the third driving chip 210C, which has third priority, activates the communication enable signal (I2C_EN) as '1', and provides the activated communication enable signal (I2C_EN) to the transmission/reception unit 331.

Table 2 shows an output state of a logic gate for generating a first enable output signal (NEXT_EN1) by each of the first to third driving chips 210A, 210B, and 210C.

TABLE 2

| | CS [0] | CS [1] | ND1 | DETECT | OR1 | AD2 |
|---|---|---|---|---|---|---|
| First driving chip | 0 | 0 | 1 | 1 | 1 | 1 |
| Second driving chip | 0 | 1 | 1 | 1 | 1 | 1 |
| Third driving chip | 1 | 1 | 0 | 1 | 1 | 0 |

Referring to Table 2, when the detection signal (DETECT) from the detection units 313 and 323 is activated as '1', the first driving chip 210A and the second driving chip 210B activate the first enable output signal (NEXT_EN1) as '1', and output the activated first enable output signal (NEXT_EN1) to the second driving chip 210B and the third driving chip 210C. In the third driving chip 210C, which has third priority, the output of the second AND gate (AD2) is inactivated as '1', because the driving chip of the next stage does not exist.

Table 3 shows the output state of a logic gate for generating a second enable output signal (NEXT_EN2) by each of the first to third driving chips 210A, 210B, and 210C.

TABLE 3

| | CS [0] | CS [1] | ND1 | I2 | DETECT | OR1 | AD3 |
|---|---|---|---|---|---|---|---|
| First driving chip | 0 | 0 | 1 | 0 | 1 | 1 | 0 |
| Second driving chip | 0 | 1 | 1 | 0 | 1 | 1 | 0 |
| Third driving chip | 1 | 1 | 0 | 1 | 1 | 1 | 1 |

Referring to Table 3, in the first driving chip 210A, which has first priority, the output of the third AND gate (AD3) is inactivated as '0' because the driving chip of the previous stage, which would function to transmit the second enable output signal (NEXT_EN2), does not exist.

When the detection signal (DETECT) from the detection units 323 and 333 is activated as '1', each of the second driving chip 210B and the third driving chip 210C activates the second enable output signal (NEXT_EN2) as '1', and outputs the activated second enable output signal (NEXT_EN2) to the second driving chip 210B and the third driving chip 210C, respectively.

Table 4 shows the output state of a logic gate for generating a source driver-on signal (SD_ON) by each of the first to third driving chips 210A, 210B, and 210C.

TABLE 4

| | CS [0] | CS [1] | NEXT_EN2 | PRE_EN2 | DETECT | OR2 |
|---|---|---|---|---|---|---|
| First driving chip | 0 | 0 | 0 | 1 | 1 | 1 |
| Second driving chip | 0 | 1 | 0 | 1 | 1 | 1 |
| Third driving chip | 1 | 1 | 1 | 0 | 1 | 1 |

Referring to Table 4, when the second enable output signal (NEXT_EN2) is activated as '1', and the activated signal is inputted from the second driving chip 210B and the third driving chip 210C, the first driving chip 210A and the second driving chip 210B activate the source driver-on signal (SD_ON) as '1', and transmit image data to the display panel.

Since the driving chip of the next stage does not exist, the third driving chip 210C activates the source driver-on signal (SD_ON) as "1" to thereby transmit the image data to the display panel when the detection signal (DETECT) from the detection unit 333 is activated.

According to embodiments of the present invention, when all of the first driving chip 210A, the second driving chip 210B, and the third driving chip 210C sequentially succeed in performing I2C communication, and the activated first enable signal (EN1) from the driving chip of a previous stage is inputted to the third driving chip 210C, which is positioned in a final stage, the third driving chip 210C activates the second enable signal (EN2), and provides the activated second enable signal (EN2) to the previous stage, so that none of the driving chips transmit data to the display panel when any one of the driving chips fails to perform I2C communication.

Accordingly, even when any one of the driving chips fails to perform I2C communication, even though the other driving chips succeed in performing I2C communication, an abnormal screen which is generated because some driving chips output image data (for example, black data) and some driving chips do not output image data, may be prevented.

In the present embodiment, an example in which the number of driving chips for the display panel is 3 has been described; however, the present invention is not limited thereto. Two driving chips, or four or more driving chips may be connected to each other in a daisy chain method to perform I2C communication with the memory.

In addition, in the present embodiment, the case in which I2C communication between the first to third driving chips, which act as a master, and the memory, which acts as a slave, is performed has been described; however, the communication method is not limited thereto. Another communication protocol, used for communication between a plurality of master chips and a slave chip, for example, an SPI (Serial Peripheral Interface) protocol, or the like, may be used.

Figure 5:
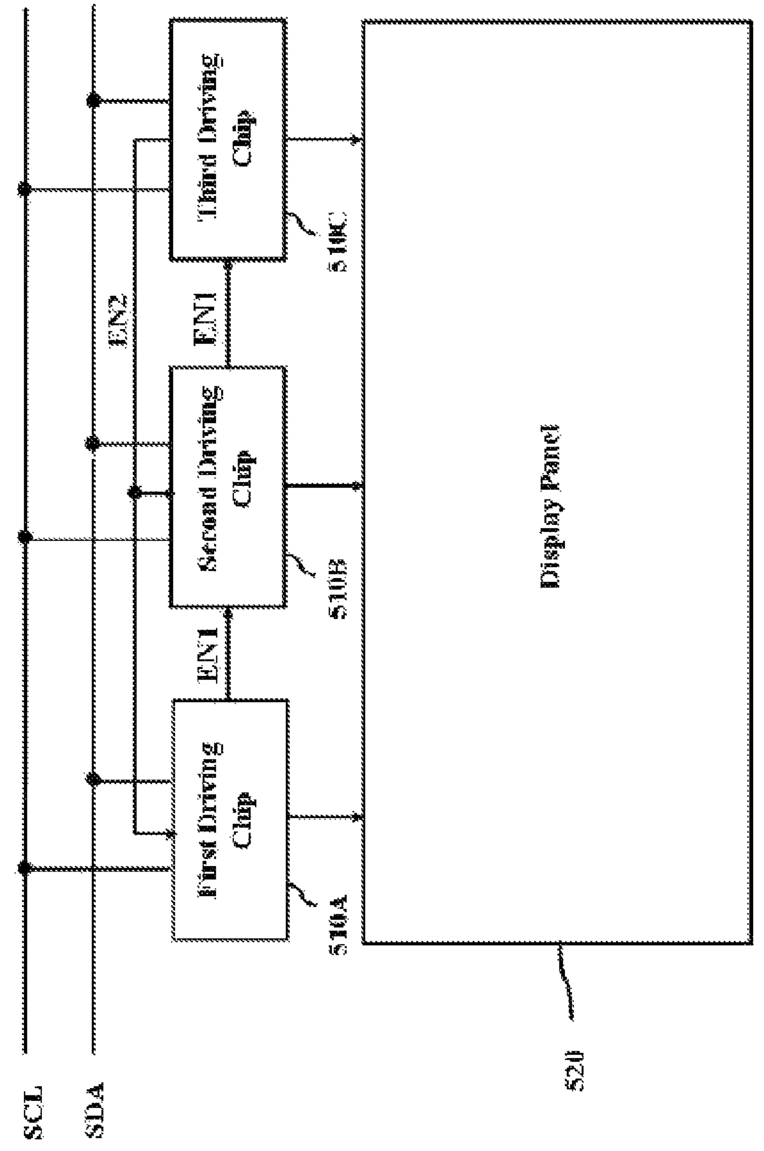
FIG. 5 is a block diagram of a driving circuit of a display apparatus according to another embodiment of the present invention.

Meanwhile, FIG. 5 is a block diagram of a driving circuit of a display apparatus according to another embodiment of the present invention.

As shown in FIG. 5, the driving circuit of the display apparatus according to another embodiment of the present invention includes a first driving chip 510A, a second driving chip 510B, and a third driving chip 510C.

The driving circuit of the display apparatus according to another embodiment of the present invention has a configuration in which the second enable signal (EN2) of the third driving chip 510C is directly provided to the first driving chip 510A through a separate signal line, without passing through the second driving chip 510B. In this case, in the second driving chip 510B, the number of input/output ports for transmitting the second enable signal (EN2) of the third driving chip 510C, which is the driving chip of the final stage, to the first driving chip 510A, which is the driving chip of the previous stage, may be reduced.

Here, in the second driving chip 510B, an example in which a plurality of driving chips connected to each other in the daisy chain method between the driving chip having first priority and the driving chip having last priority is described.

As is apparent from the above description, the present invention provides the driving circuit of the display apparatus, which shuts off the output of image data when any one of driving chips is not operated normally, in a display apparatus in which the driving chips for driving the display panel are connected to each other in the daisy chain method, thereby preventing an abnormal screen from being generated on the display panel.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A driving circuit of a display apparatus, comprising:

driving chips configured to perform a timing control function and a source driving function, perform communication with a memory, and obtain driving information of a display panel, wherein the driving chips sequentially execute an operation of transmitting a first enable signal in one direction when communication with the memory is performed and is normally completed in an initialization stage, wherein a final stage driving chip among the driving chips transmits a second enable signal in the other direction opposite to the one direction, generates image data, and transmits the generated image data to the display panel when communication with the memory is performed and is normally completed after the first enable signal is received, and wherein driving chips other than the final stage driving chip generate image data and transmit the generated image data to the display panel when the second enable signal is received.

2. The driving circuit according to claim 1, wherein the driving chips are connected to each other in a daisy chain method.

3. The driving circuit according to claim 1, wherein the final stage driving chip transmits the second enable signal to the other driving chips through a separate signal line.

4. The driving circuit according to claim 1, wherein the initialization stage includes a state in which electric power is applied and a normality signal is not inputted, or a state in which electric power is applied and an abnormality signal outside a normal operation range is inputted.

5. The driving circuit according to claim 1, wherein the driving chips perform I2C communication with the memory through a data line and a clock line so as to obtain the driving information of the display panel.

6. The driving circuit according to claim 5, wherein a priority of the driving chips is set using an option pin so as to avoid a collision at the time of the I2C communication.

7. A driving chip as any one driving chip among driving chips which perform a timing control function and a source driving function so as to drive a display panel, perform communication with a memory, and obtain driving information of the display panel, wherein the driving chip transmits a first enable signal to an adjacent driving chip when the communication with the memory is completed successfully in an initialization stage, and wherein the driving chip generates image data using a clock of an internal oscillator and transmits the generated image data to the display panel when a second enable signal, indicating that communication between all of the driving chips and the memory is completed successfully, is received from another driving chip.

8. The driving chip according to claim 7, comprising:

a transmission/reception unit configured to perform communication with the memory in response to a communication enable signal;

a detection unit configured to detect whether communication is completed successfully in the transmission/reception unit, and output a detection signal;

a source driving unit configured to generate the image data in response to a source driver-on signal; and a signal processing unit configured to generate the communication enable signal in accordance with the set priority or the first enable signal transmitted from the adjacent driving chip, and transmit the generated communication enable signal to the transmission/reception unit.

9. The driving chip according to claim 8, wherein the signal processing unit receives the detection signal outputted from the detection unit, generates the first enable signal, and provides the generated first enable signal to the adjacent driving chip.

10. The driving chip according to claim 9, wherein, when the second enable signal is received from the adjacent driving chip, the signal processing unit generates the source driver-on signal, and provides the generated source driver-on signal to the source driving unit.

11. The driving chip according to claim 10, further comprising:

a timing control unit configured to supply a timing signal required for driving the source driving unit;

a register configured to store the driving information provided from the transmission/reception unit and provide the driving information to the source driving unit and the timing control unit; and an oscillator configured to generate a clock and provide the generated clock to the detection unit.

12. The driving chip according to claim 10, wherein the signal processing unit comprises:

a NOR gate configured to perform a NOR operation on chip selection signals;

a first inverter configured to invert and output an output signal of the NOR gate;

a first AND gate configured to perform an AND operation on an output signal of the first inverter and a first enable input signal inputted from the driving chip of a previous stage;

a first OR gate configured to perform an OR operation on the output signal of the NOR gate and an output signal of the first AND gate, and output a communication enable signal;

a NAND gate configured to perform a NAND operation on the chip selection signals;

a second inverter configured to convert and output an output signal of the NAND gate;

a second AND gate configured to perform an AND operation on an output signal of the first OR gate, a detection signal, and the output signal of the NAND gate, and output a first enable output signal;

a third AND gate configured to perform an AND operation on the output signal of the first OR gate, the detection signal, and an output signal of the second inverter, and output a second enable output signal; and a second OR gate configured to perform an OR operation on an output signal of the third AND gate and a second enable input signal inputted from the driving chip of a next stage, and output the source driver-on signal.

13. The driving chip according to claim 10, wherein the signal processing unit performs an operation on the chip selection signal, which determines a priority of communication with the memory, and on a first enable input signal provided from another adjacent driving chip, and generates the communication enable signal, performs an operation on the communication enable signal, the detection signal, and the chip selection signal, and generates a first enable output signal, performs an operation on the communication enable signal, the chip selection signal and the detection signal, and generates a second enable output signal, and performs an operation on the second enable output signal and a second enable input signal, and generates the source driver-on signal.

14. A driving chip, as a final stage driving chip among driving chips which perform a timing control function and a source driving function so as to drive a display panel, perform communication with a memory, and are connected to each other in a daisy chain method so as to obtain driving information of the display panel, the driving chip performing communication with the memory when a first enable signal is received from an adjacent driving chip in an initialization stage, and transmitting a second enable signal to the adjacent driving chip when the communication with the memory is completed successfully, generating image data using a clock of an internal oscillator, transmitting the generated image data to the display panel.

15. The driving chip according to claim 14, comprising:

a transmission/reception unit configured to perform communication with the memory in response to a communication enable signal;

a detection unit configured to detect successful completion of communication of the transmission/reception unit, and output the detected successful completion of communication as a detection signal;

a source driving unit configured to generate the image data in response to the source driver-on signal; and a signal processing unit configured to generate the communication enable signal in accordance with the first enable signal transmitted from the adjacent driving chip, and provide the generated communication enable signal to the transmission/reception unit.

16. The driving chip according to claim 15, wherein the signal processing unit receives the detection signal outputted from the detection unit, transmits the second enable signal to the adjacent driving chip, and provides the source driver-on signal to the source driving unit.

17. The driving chip according to claim 16, wherein the signal processing unit performs an operation on a chip selection signal, which determines a priority of communication with the memory, and on a first enable input signal, which is provided from another adjacent driving chip, and generates the communication enable signal, performs an operation on the communication enable signal, the detection signal and the chip selection signal, and generates a first enable output signal, performs an operation on the communication enable signal, the chip selection signal, and the detection signal, and generates a second enable output signal, and performs an operation on the second enable output signal and a second enable input signal, and generates the source driver-on signal.

18. The driving chip according to claim 16, further comprising:

a timing control unit configured to supply a timing signal required for driving the source driving unit;

a register configured to store the driving information provided from the transmission/reception unit, and provide the driving information to the source driving unit and the timing control unit; and an oscillator configured to generate a clock, and provide the generated clock to the detection unit.

* * * * *